(12) United States Patent
Chen et al.

(10) Patent No.: US 9,285,520 B2
(45) Date of Patent: Mar. 15, 2016

(54) OPTICAL TOUCH DISPLAY DEVICE AND COLOR FILTER THEREOF

(71) Applicant: AU OPTRONICS CORP., Hsin-Chu (TW)

(72) Inventors: Chien-Kai Chen, Hsin-Chu (TW); Chia-Hao Li, Hsin-Chu (TW); Chen-Hsien Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 112 days.

(21) Appl. No.: 13/894,512

(22) Filed: May 15, 2013

(65) Prior Publication Data
US 2014/0049700 A1    Feb. 20, 2014

(30) Foreign Application Priority Data
Aug. 15, 2012    (TW) .............................. 101129578 A

(51) Int. Cl.
*G02F 1/1335* (2006.01)
*G02B 5/20* (2006.01)
*G06F 1/16* (2006.01)
*G02B 5/22* (2006.01)
*G06F 3/042* (2006.01)

(52) U.S. Cl.
CPC *G02B 5/20* (2013.01); *G02B 5/201* (2013.01); *G02B 5/223* (2013.01); *G06F 1/1692* (2013.01); *G06F 3/042* (2013.01)

(58) Field of Classification Search
CPC .......... G02B 5/20; G02B 5/201; G02B 5/223; G06F 1/1692; G06F 3/042
USPC ........................................................ 349/106
See application file for complete search history.

(56) References Cited

U.S. PATENT DOCUMENTS

| 6,826,001 | B2  |    | 11/2004 | Funakura et al. |
|-----------|-----|----|---------|-----------------|
| 6,909,485 | B2  | *  | 6/2005  | Yoon et al. .................... 349/123 |
| 7,636,141 | B2  |    | 12/2009 | Sugawara et al. |
| 2002/0045112 | A1 |  | 4/2002  | Kishimoto et al. |
| 2002/0154257 | A1 | * | 10/2002 | Iijima ............................ 349/67 |
| 2003/0174265 | A1 | * | 9/2003  | Sugawara .................... 349/106 |
| 2003/0184694 | A1 | * | 10/2003 | Chang et al. ................ 349/113 |
| 2005/0131114 | A1 | * | 6/2005  | Sunahara et al. ............. 524/88 |
| 2007/0146916 | A1 |  | 6/2007  | Yang et al. |

(Continued)

FOREIGN PATENT DOCUMENTS

| CN | 102323636 A | 1/2012 |
| CN | 102368191 A | 3/2012 |

(Continued)

OTHER PUBLICATIONS

China Patent Office, "Office Action", Mar. 12, 2014.

(Continued)

*Primary Examiner* — Hoan C Nguyen
(74) *Attorney, Agent, or Firm* — WPAT, PC; Justin King

(57) ABSTRACT

A color filter including a substrate and a green photoresist is provided. The green photoresist is disposed on the substrate, and the spectrum function thereof has a first peak within a wavelength window between 480 nm and 550 nm. Whereas a transmittance intensity of the spectrum function of green photoresist at wavelength 750 nm is greater than that of 0.5 times of the transmittance intensity of the first peak. An optical touch display device with the color filter is also provided.

9 Claims, 2 Drawing Sheets

(56) References Cited

U.S. PATENT DOCUMENTS

| | | |
|---|---|---|
| 2011/0157094 A1 | 6/2011 | Boer et al. |
| 2011/0234950 A1* | 9/2011 | Yamada et al. ............... 349/109 |
| 2012/0162126 A1 | 6/2012 | Yuan et al. |
| 2012/0169215 A1 | 7/2012 | Liu et al. |
| 2012/0275045 A1* | 11/2012 | Chen et al. .................... 359/891 |
| 2014/0176859 A1* | 6/2014 | Lin et al. ......................... 349/62 |

FOREIGN PATENT DOCUMENTS

| | | |
|---|---|---|
| TW | 548488 B | 8/2003 |
| TW | 200724990 A | 7/2007 |
| TW | I295741 B | 4/2008 |
| TW | 201227465 A | 7/2012 |

OTHER PUBLICATIONS

Taiwan Patent Office "Office Action", May 28, 2014.

* cited by examiner

OPTICAL TOUCH DISPLAY DEVICE AND COLOR FILTER THEREOF

TECHNICAL FIELD

The present invention relates to an optical touch display device, and more particularly to an optical touch display device including a color filter.

BACKGROUND

With the progressing of the technology, the touch display device is widely used in electric products, such as tablet personal computer and smart phone. In the conventional touch display device, a light with long wavelength is used as detecting light, and a plurality of light-detecting elements are used for receiving the detecting light reflected from a touch operating element into the display device through a color filter. Generally, the color filter includes a plurality of red photoresists, a plurality of blue photoresists and a plurality of green photoresists. However, according the current technique, there are only the red photoresists having the enough light transmittance with respect to the detecting light with long wavelength. Therefore, in order to increase the light intensity received by the light-detecting elements, the light-detecting elements are disposed to correspond to the red photoresists in the conventional touch display device. Accordingly, the amount of the light-detecting elements disposed in the conventional touch display device is limited by the arrangement of the light-detecting elements, so it is difficult to increase the photo-sensing resolution of the conventional touch display device.

In another conventional touch display device, the sensing areas of the light-detecting elements are enlarged for increasing the light intensity received thereby. However, the brightness and the color saturation of the touch display device would be decreased.

BRIEF SUMMARY

Therefore, the object of the present invention is to provide a color filter having a green photoresist with high light transmission for the light with long wavelength.

Another object of the present invention is to provide an optical touch display device including the above-mentioned color filter to display images with good color performance and high-brightness.

The present invention provides a color filter including a substrate and a green photoresist. The green photoresist is disposed on the substrate. The spectrum function of the green photoresist has a first peak within a wavelength window substantially between 480 nm and 550 nm, and a transmittance intensity of the spectrum function of green photoresist at wavelength 750 nm is substantially greater than that of 0.5 times of the transmittance intensity of the first peak.

The present invention also provides an optical touch display device including an active elements array substrate, the above-mentioned color filter, a plurality of light-detecting elements, a display medium layer and a back light source. The color filter is disposed above the active elements array substrate. The light-detecting elements are disposed on the active elements array substrate and corresponded to the green photoresist. The display medium layer is disposed between the color filter and the active elements array substrate. The back light source is disposed under the active elements array substrate.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
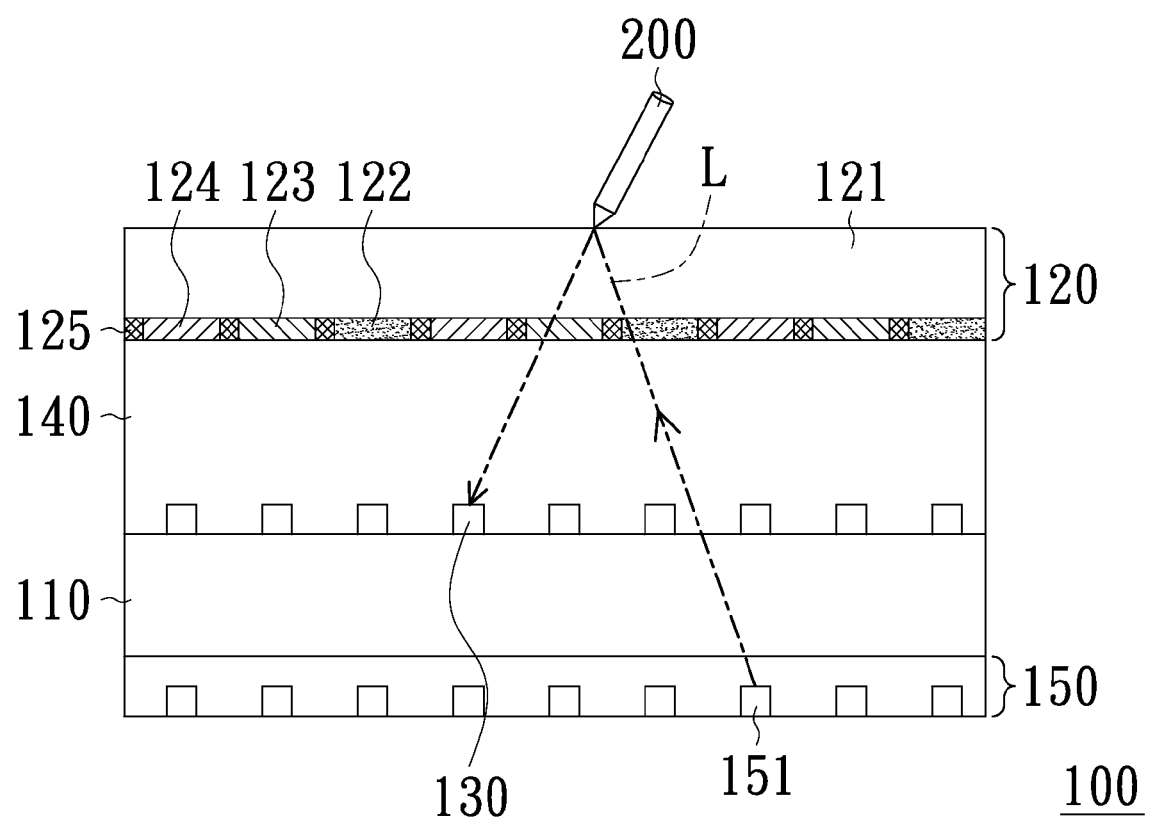
FIG. 1 is a cross-section view of the optical touch display device according to an embodiment of the invention.
Figure 2:
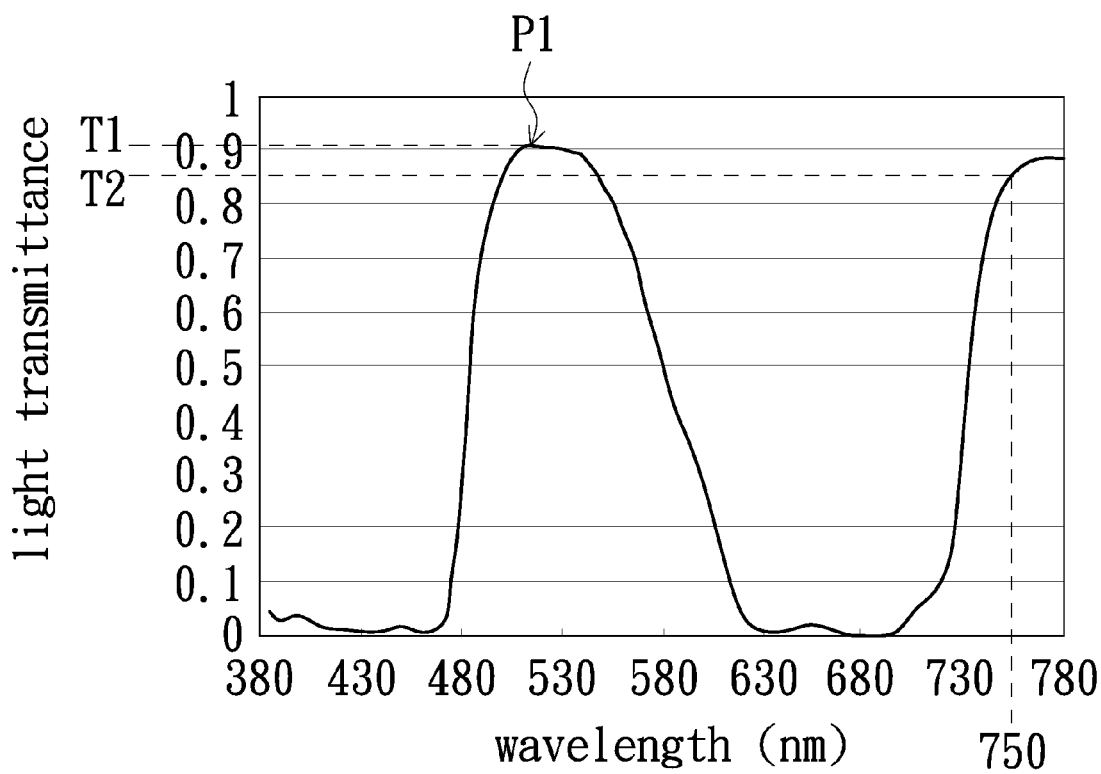
FIG. 2 is a diagram illustrating a light transmitting spectrum function of the green photoresist according to an embodiment of the invention.

FIG. 1 is a cross-section view of the optical touch display device according to an embodiment of the invention, and FIG. 2 is a diagram illustrating a light transmitting spectrum function of the green photoresist shown in FIG. 1. Referring to FIG. 1 and FIG. 2, the optical touch display device 100 includes an active elements array substrate 110, a color filter 120, a plurality of light-detecting elements 130, a display medium layer 140 and a back light source 150. The color filter 120 is disposed above the active elements array substrate 110. Moreover, the color filter 120 includes a substrate 121 and a green photoresist 123 disposed on the substrate 121. In detail, the spectrum function of the green photoresist 123 has a first peak P1 within the wavelength window substantially between 480 nm and 550 nm, and a transmittance intensity T2 of the spectrum function of green photoresist 123 at wavelength 750 nm is substantially greater than that of 0.5 times of the transmittance intensity T1 of the first peak P1. Specifically, the transmittance intensity T1 of the first peak P1 is, for example, substantially between 0.8 and 1. Although there is only a single green photoresist 123 shown in FIG. 1, but the invention is not limited hereto. The color filter 121 may include a plurality of green photoresists 123.

As above-mentioned, the light-detecting elements 130 are disposed on the active elements array substrate 110 and correspond to the green photoresist 123. The display medium layer 140 is disposed between the color filter 120 and the active elements array substrate 110. Further, the display medium layer 140 is, for example, liquid crystal layer, but the invention is not limited hereto. The back light source 150 is disposed under the active elements array substrate 110 and includes a plurality of detecting light emitting elements 151. Each detecting light emitting element 151 is used for emitting a detecting light L.

A touch operating element 200 is used for operating the optical touch display device 100 in this embodiment. Specifically, the touch operating element 200 is, for example, finger(s), touch pen or other object. After the detecting light L emitted from the detecting light emitting element 151 emitting to the touch operating element 200, the detecting light L is reflected by the touch operating element 200 and then passes through the green photoresist 123 and is absorbed by the light-detecting elements 130. The detecting light emitting element 151 is, for example, light emitting diode (so-called LED), and the wavelength of the detecting light L emitted therefrom is, for example, substantially greater than 700 nm. Since the spectrum function of the green photoresist 123 of this embodiment has an improved light transmittance T2 at wavelength 750 nm, the light transmittance of the detecting light L with a wavelength greater than 700 nm with respect to the green photoresist 123 can be increased.

Moreover, the color filter 121 usually further includes a plurality of blue photoresists 122, a plurality of red photoresists 124 and a black matrix 125 disposed among the blue photoresists 122, the green photoresists 123 and the red photoresists 124. The material of the black matrix 125 is, for example, resin, metal or other light-shielding materials. The blue photoresists 122, the green photoresists 123 and the red photoresists 124 can be arranged on the substrate 121 with triangle type, mosaic type, stripe type or four pixels type, but the invention is not limited hereto.

In this embodiment, the green photoresist 123 may be made of green dye, such as triphenylmethane derivative. The blue photoresist 122 may be made of blue dye or the mixture of blue pigment and violet dye, such as anthraquinone derivative or premetallized derivative.

Figure 3:
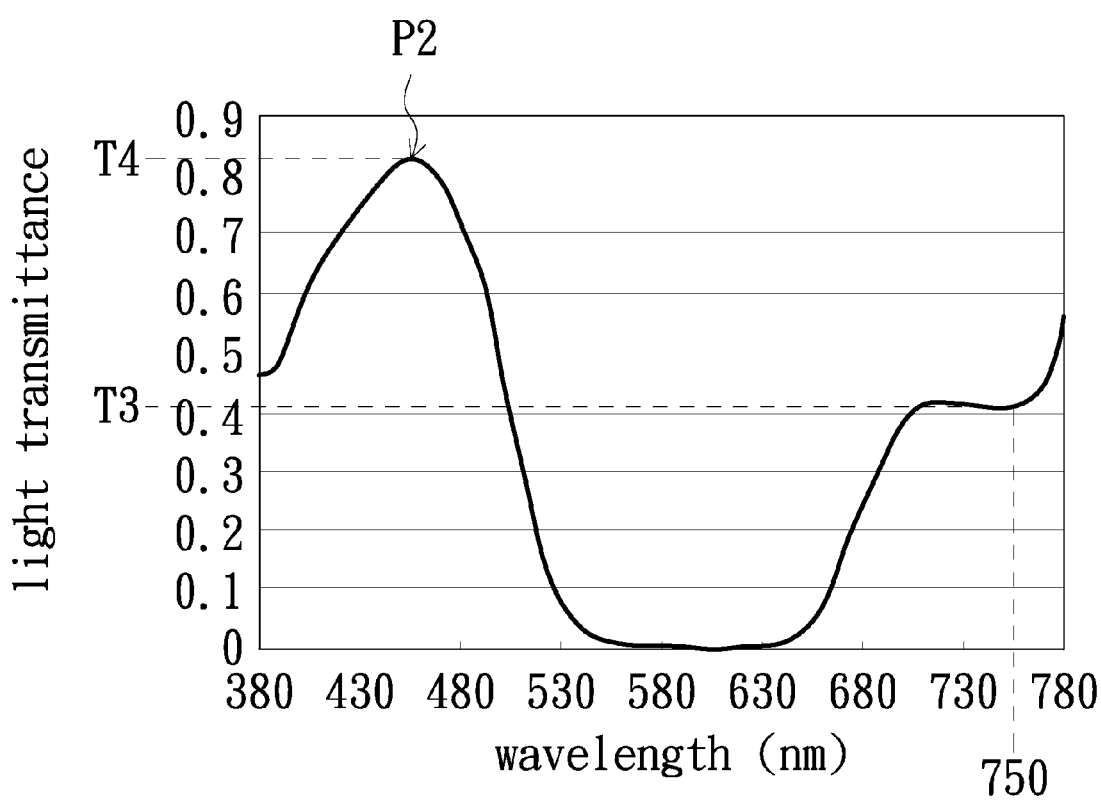
FIG. 3 is a diagram illustrating a light transmitting spectrum function of the blue photoresist according to an embodiment of the invention.

As shown in FIG. 3, the spectrum function of the blue photoresist 122 in this embodiment has a second peak P2 within the wavelength window substantially between 420 nm and 470 nm, and a transmittance intensity T3 of the spectrum function of the blue photoresist 122 at wavelength 750 nm is substantially greater than that of 0.3 times of the transmittance intensity T4 of the second peak P2. Specifically, the transmittance intensity T4 of the second peak P2 is, for example, substantially between 0.8 and 0.9. That is, the transmittance intensities of the spectrum functions of the blue photoresist 122 and the green photoresist 123 at wavelength 750 nm are both large enough, therefore, in the optical touch display device 100 which uses the light with wavelength substantially greater than 700 nm as the detecting light L, the blue photoresist 122 and the green photoresist 123 have improved light transmittance with respect to the detecting light L, so that the light-detecting elements 130 disposed to correspond to the blue photoresist 122 and the green photoresist 123 can receive light signals with enough intensity.

Accordingly, the light-detecting elements 130 of this embodiment can be disposed to correspond to the blue photoresists 122, the green photoresists 123 and the red photoresists 124, so that the areas of the blue photoresists 122, the green photoresists 123 and the red photoresists 124 are the same in the color filter 120. Therefore, the color filter 120 can has high color saturation.

In summary, since the green photoresist of the color filter of the invention has enough light transmittance with respect to the light with a wavelength at long wave band, in addition to be disposed to correspond to the red photoresist, the light-detecting elements further be disposed to correspond to green photoresist to absorb the detecting light with long wavelength. Compare to conventional color filter, the areas of the light-detecting elements the color filter of the invention are unnecessary to be enlarged, therefore the light transmittance of the optical touch display device can be improved. Moreover, the light-detecting elements of the color filter of the invention can be disposed to uniformly correspond to the photoresists with different color, so that the color saturation of the optical touch display device of the invention can be increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color filter, comprising:
a substrate;
a green photoresist disposed on the substrate, wherein the spectrum function of the green photoresist has a first peak within a wavelength window substantially between 480 nm and 550 nm, and a transmittance intensity of the spectrum function of green photoresist at wavelength 750 nm is substantially greater than that of 0.5 times of the transmittance intensity of the first peak; and
a blue photoresist disposed on the substrate, wherein the spectrum function of the blue photoresist has a second peak within a wavelength window substantially between 420 nm and 470 nm, and a transmittance intensity of the spectrum function of the blue photoresist at wavelength 750 nm is substantially greater than that of 0.3 times of the transmittance intensity of the second peak,
wherein the transmittance intensity of the first peak is substantially between 0.9 and 1.0, the transmittance intensity of the spectrum function of green photoresist at wavelength 750 nm is substantially between 0.8 and 0.9 and at between wavelength 670 nm and 700 nm is substantially zero, the transmittance intensity of the second peak is substantially between 0.8 and 0.9, the transmittance intensity of the spectrum function of blue photoresist at wavelength 750 nm is substantially between 0.4 and 0.5, and greater than 0.4 and at between wavelength 560 nm and 630 nm is substantially zero.

2. The color filter according to claim 1, wherein the blue photoresist comprises blue dye or mixture of blue pigment and violet dye.

3. The color filter according to claim 1, wherein the green photoresist comprising green dye and yellow pigment.

4. The color filter according to claim 1, further comprising a red photoresist disposed on the substrate, wherein the area of the red photoresist is the same with that of the green photoresist.

5. An optical touch display device, comprising:
an active elements array substrate;
a color filter disposed above the active elements array substrate, the color filter comprising:
a substrate; and
a green photoresist disposed on the substrate, wherein the spectrum function of the green photoresist has a first peak within a wavelength window substantially between 480 nm and 550 nm, a transmittance intensity of the spectrum function of green photoresist at wavelength 750 nm is substantially greater than that of 0.5 times of the transmittance intensity of the first peak, and the transmittance intensity of the first peak is substantially between 0.9 and 1.0, and the transmittance intensity of the spectrum function of green photoresist at wavelength 750 nm is substantially between 0.8 and 0.9 and at between wavelength 670 nm and 700 nm is substantially zero;
a blue photoresist disposed on the substrate, wherein the spectrum function of the blue photoresist has a second peak within a wavelength window substantially between 420 nm and 470 nm, and a transmittance intensity of the spectrum function of the blue photoresist at wavelength 750 nm is substantially greater than that of 0.3 times of the transmittance intensity of the second peak, the transmittance intensity of the second peak is substantially between 0.8 and 0.9, the transmittance intensity of the spectrum function of blue photoresist at wavelength 750 nm is substantially between 0.4 and 0.5, and greater than 0.4 and at between wavelength 560 nm and 630 nm is substantially zero;

a plurality of light-detecting elements disposed on the active elements array substrate and corresponded to the green photoresist;

a display medium layer disposed between the color filter and the active elements array substrate; and a back light source disposed under the active elements array substrate.

6. The optical touch display device according to claim 5, wherein the blue photoresist comprises blue dye or mixture of blue pigment and violet dye, and the green photoresist comprises green dye.

7. The optical touch display device according to claim 6, the wavelength of the detecting light is substantially greater than 700 nm.

8. The optical touch display device according to claim 5, wherein the color filter further comprises a red photoresist disposed on the substrate, wherein the area of the red photoresist is the same with that of the green photoresist.

9. The optical touch display device according to claim 5, wherein the back light source comprises a plurality of detecting-light emitting elements, each one of the detecting light emitting element is adapted for emitting a detecting light penetrating through the green photoresist.

\* \* \* \* \*